2,839,361
DEFLUORINATION OF PHOSPHATE ROCK

Clinton A. Hollingsworth, Lakeland, Fla., and John C. Williams, Catasauqua, Ohio, assignors to Smith-Douglass Company, Incorporated, Norfolk, Va., a corporation of Virginia No Drawing. Application October 14, 1954
Serial No. 462,376

2 Claims. (Cl. 23—108)

This invention relates to the defluorination of phosphate rock and similar natural phosphate materials, and has for its object the provision of an improved method of defluorinating such materials by calcination.

In our copending application for Letters Patent of the United States, Serial No. 213,284, filed Feb. 28, 1951, we have described and claimed a method of defluorinating phosphate rock by calcination in the presence of the reaction product of sodium carbonate ($Na_2CO_3$) and phosphoric acid ($H_3PO_4$) under certain prescribed conditions involving (among other conditions) the ratio of sodium oxide ($Na_2O$) to phosphorus pentoxide ($P_2O_5$) in the reaction product and the grade ($P_2O_5$ content) and the lime (CaO) and silica ($SiO_2$) contents of the phosphate rock. We recognize in that application that some sodium compounds other than the carbonate (e. g. the bicarbonate ($NaHCO_3$), hydroxide (NaOH) etc.) react with phosphoric acid in equivalent manner. We have now made the surprising and entirely unexpected discovery that when phosphate rock is calcined at a temperature exceeding 2600° F. in the presence of water vapor and a mixture of sodium chloride (NaCl) and phosphoric acid, under substantially the same conditions as prescribed in our aforementioned application, substantially complete defluorination can be effected without objectionable fusion or sintering of the calcining charge. The present invention is based on that discovery, and involves defluorinating phosphate rock by calcination at a temperature of at least 2600° F. without substantial fusion in the presence of water vapor and of a reagent mixture consisting essentially of sodium chloride and phosphoric acid, with a mol ratio of sodium to phosphorus (calculated as $Na_2O$ and $P_2O_5$ respectively) in the mixture between 1.6 and 2.8, and with such relative amounts of CaO, $Na_2O$, $P_2O_5$ and $SiO_2$ in the combined phosphate rock and reagent mixture that the mol ratio of these constituents is between 1.3 and 2.8 (and preferably between 1.6 and 2) in the molar formula $$\frac{\text{Mols CaO} + Na_2O - 3P_2O_5}{\text{Mols } SiO_2}$$

Since part, at least of the efficacy of the sodium chloride in imparting refractoriness to the calcining charge is believed to be due to the sodium oxide that results from the decomposition of the chloride during calcination in the presence of water vapor, the ratio of sodium to phosphorus in the reagent mixture is in practice considered a ratio of $Na_2O$ to $P_2O_5$ and is herein so referred to.

It is essential that the silica content of the calcining charge (i. e. the combined phosphate rock and reagent mixture) be within the range of 2 to 6% (by weight on a dry basis) determined, as customary in the phosphate industry, as insoluble matter (insol.). The silica (or insol.) content of the rock then determines the relative proportions of CaO, $Na_2O$ and $P_2O_5$ in the calcining charge, in accordance with the aforesaid molar formula. Additionally, it is essential that the molar ratio of $Na_2O$ to $P_2O_5$ in the reagent mixture added to the rock be within the range of 1.6 and 2.8.

In plant practice it is frequently more convenient to determine and express the ratio of $Na_2O$ to $P_2O_5$ in the reaction mixture in terms of actual weights, and so expressed the mol ratio ($Na_2O$ to $P_2O_5$) of 1.6 to 2.8 becomes the weight ratio of 0.7 to 1.2. A convenient and preferred weight ratio of $Na_2O$ to $P_2O_5$ in the reagent mixture is around 1, corresponding to a mol ratio of about 2.3. When the calcining charge is made up of approximately 93% of phosphate rock (containing about 35% $P_2O_5$, about 50% CaO and from 4 to 5% insol) and 7% of added $Na_2O$ and $P_2O_5$ in the form of a reagent mixture having a $Na_2O/P_2O_5$ weight ratio of 1 (all percentages being by weight on a dry basis), the mol ratio of the constituents of the calcining charge in the aforementioned molar formula will be approximately 1.6 to 2.0.

In practicing the invention on run-of-mine rock of fairly constant grade (i. e. $P_2O_5$ content) but of variable silica content, it is convenient and practical to determine the composition of the reagent mixture on the basis of the insol (silica) content of the rock, rather than on the basis of the aforementioned molar formula. Thus, with a phosphate rock running around 35% $P_2O_5$ (say 33 to 36% $P_2O_5$), the composition of the reagent mixture can be determined from the following table on the basis of the insol. content of the rock:

| Percent insol | Broad range | | Preferred range | |
|---|---|---|---|---|
| | Wt. Ratio, $Na_2O/P_2O_5$ | Mol Ratio, $Na_2O/P_2O_5$ | Wt. Ratio, $Na_2O/P_2O_5$ | Mol Ratio, $Na_2O/P_2O_5$ |
| 2.0–3.0 | 0.70–100 | 1.60–2.30 | 0.83–0.96 | 1.90–2.20 |
| 3.0–4.0 | 0.76–1.07 | 1.75–2.45 | 0.87–1.00 | 2.00–2.30 |
| 4.0–5.0 | 0.83–1.14 | 1.90–2.60 | 0.92–1.05 | 2.10–2.40 |
| 5.0–6.0 | 0.90–1.20 | 2.05–2.75 | 0.96–1.09 | 2.20–2.50 |

It will be seen that as the silica (insol.) content of the rock increases from 2 to 6%, the preferred mol ratio of $Na_2O/P_2O_5$ increases from 1.90 to 2.50; an increase of 0.15 for each increase of 1% in the silica content of the rock. For the ratio to thus increase, the $P_2O_5$ (in the reagent mixture) must decrease in relation to the $Na_2O$, and this decrease in $P_2O_5$ will be proportional to the increase in the silica content of the rock. Thus, by making up the reagent mixture from the foregoing table the critical molar formula range of the invention is conveniently attained in plant practice.

Where the silica (insol.) content of the run-of-mine rock (containing 33–36% $P_2O_5$) is fairly constant between about 3% and 3.5%, the critical ratios of the invention may conveniently be attained by use of the following table; the determining factor being the amount of $P_2O_5$ added in the reaction mixture expressed in percent by weight on the combined weight of the rock and the $Na_2O$ and $P_2O_5$ in the reagent mixture, all weights being on a dry basis. Thus, with 5% of added $P_2O_5$, the added $Na_2O$ will be 4.2% (i. e. 5×.84), and the balance of the calcining charge (90.8% by weight) will be phosphate rock. The amount of added $P_2O_5$ is determined to a large extent on the current availability of phosphoric acid, and preferably is between 5 and 6%. As indicated in the table, increasing the amount of added $P_2O_5$ decreases the $Na_2O/P_2O_5$ ratio. The currently desired $Na_2O/P_2O_5$ ratio of the reagent mixture is maintained by the plant analytical laboratory.

*Calcining charge table*

| Added P$_2$O$_5$, percent by weight | Na$_2$O/P$_2$O$_5$ weight ratio | Added Na$_2$O, percent by weight | Phosphate Rock About 3-3.5 insol, percent by weight |
| --- | --- | --- | --- |
| 3.0 | 0.92 | 2.76 | 94.24 |
| 3.5 | 0.90 | 3.15 | 93.35 |
| 4.0 | 0.88 | 3.52 | 92.48 |
| 4.5 | 0.86 | 3.87 | 91.63 |
| 5.0 | 0.84 | 4.2 | 90.8 |
| 5.5 | 0.82 | 4.51 | 89.99 |
| 6.0 | 0.80 | 4.8 | 89.2 |

In practicing the invention in a rotary kiln, the phosphate rock is introduced into the feed or cold end of the kiln along with the reagent mixture. The reagent mixture is conveniently prepared by dissolving a predetermined amount of any commercially available form of sodium chloride or common salt in a predetermined amount of an aqueous solution of crude phosphoric acid in a suitable reaction tank with constant stirring. The reaction tank and other equipment for handling the reagent mixture is rubber-lined, or otherwise suitably protected against the corrosive effects of dilute phosphoric acid. Thus, the sodium chloride may be dissolved in the excess water of a relatively dilute aqueous solution of phosphoric acid, such as an unconcentrated wet process phosphoric acid. When practicing the invention with the preferred Na$_2$O/P$_2$O$_5$ weight ratio of 1, the maximum concentration of P$_2$O$_5$ in the phosphoric acid solution is about 15% in order that the amount of sodium chloride required to give the preferred weight ratio can be dissolved in the excess water of the phosphoric acid solution. The concentration of the chemical compounds in the resulting reagent mixture will be around 23%. Since the phosphate rock customarily contains 10 to 14% moisture, when the aforesaid reagent mixture is mixed therewith, at the feed end of the kiln, there results a slurry containing 30 to 40% of water.

The phosphate rock may be of any of the usual commercial products of a phosphate rock mill or concentrator. The particle size of the rock is not especially critical, and a larger proportion of fine particle size material may be included in the calcining charge, as contrasted with other defluorinating processes in which rock of fine particle size is troublesome. Thus, in practicing the invention, it is possible to include in the calcining charge substantial amounts of froth flotation concentrate (mostly minus 20 mesh and plus 150 mesh), and plant concentrate (combined belt and froth flotation concentrates, mostly minus 14 mesh and plus 150 mesh). Generally speaking, it is desirable in defluorinating processes in which phosphoric acid is included in the calcining charge to use as much fine particle size rock as possible, and the possibility of doing so is an advantage of the invention. It has been found that a coarse feed (e. g. washer plant screen product) is usually discharged from a rotary kiln with a finer particle size than the feed, while a fine feed (e. g. froth flotation concentrate) is usually discharged with a coarser particle size than the feed.

Calcination is most conveniently carried out in a rotary kiln, although other types of calcining equipment may be used. Calcination is conducted in the presence of water vapor, care being exercised to assure intimate and continuous association of water vapor with the entire body of the charge until substantially complete defluorination is effected. The calcining temperature should ultimately be sufficiently high to eliminate substantially all of the fluorine and to impart high fertilizer availability to the phosphate content of the calcined product, and to this end should be at least 2600° F. and may be as high as 2800° F. Calcination is carried out in the absence of substantial fusion or sintering of the charge. A detention period of 10 to 20 minutes at approximately the ultimate calcining temperature, e. g. the hot zone of a rotary kiln, is sufficient to substantially defluorinate the rock and impart high fertilizer availability to its phosphate content.

In a rotary kiln, the depth of charge should be such as to insure adequate penetration of water vapor and escape of evolved fluorine. Too deep a bed of charge impairs these requirements and results in poor defluorination. Where calcination is carried out in a single pass through a rotary kiln 6 to 8 feet in diameter and 120 to 250 feet in length, rotating at a speed of from 15 to 50 seconds per revolution, a feed rate of 1 to 10 tons per hour gives a satisfactory depth of charge for effective defluorination.

Calcination may be carried out in two stages. The first stage, for convenience called the calcining burn, may be carried out in a relatively short rotary kiln, e. g. 60-140 feet, at a temperature of 2000-2500° F. with a rate of feed up to 20 tons per hour. The second stage, for convenience called the defluorinating burn, may then be carried out in a much longer kiln, e. g. 140-250 feet, at a temperature of 2600-2800° F. with a feed rate up to 10 tons per hour. In plant practice it is customary to speak of these stages as "passes," i. e. first pass and second pass. The lumps and cakes of the first pass calcine or clinker are crushed to mostly minus ¼ inch (3 mesh), and the crushed clinker is fed dry to the second pass.

The following example illustrates a practice of the invention on a commercial scale in two passes:

*1st pass operation*

Feed (unground concentrate):
Percent phosphate rock _____ 91.44
Percent P$_2$O$_5$ (added as H$_3$PO$_4$) _____ 4.41
Percent Na$_2$O (added as NaCl) _____ 4.15

100.00

The Na$_2$O/P$_2$O$_5$ weight ratio in the reagent mixture was 0.94. The molar formula ratio of the calcining charge (feed) was 2.2.

*Chemical analyses*

|  | P$_2$O$_5$ | SiO$_2$ | CaO | Na$_2$O | F |
| --- | --- | --- | --- | --- | --- |
| Phosphate rock | 35.14 | 3.36 | 50.05 | ____ | 3.58 |
| Feed (calculated) | 36.54 | 3.07 | 45.77 | 4.15 | 3.27 |
| 1st Pass Calcine | 39.02 | 3.27 | 49.40 | 4.50 | 2.85 |

*Screen analysis*

|  | +35 | −35+100 | −100 |
| --- | --- | --- | --- |
| Phosphate rock | 22.9 | 72.3 | 4.8 |

The first pass was conducted in an 8' x 140' rotary kiln at a temperature of about 2200° F. in the hot zone. The feed rate was about 10 tons per hour.

*2nd pass operation*

The 2nd pass operation was conducted in a 6½' x 165' rotary kiln at a temperature of about 2700° F. The first pass clinker was screened and crushed to minus ¼" before feeding to the 2nd pass kiln. The feed rate was about 2.9 tons per hour. A typical clinker analysis is given below:

Percent P$_2$O$_5$ _____ 39.90
Percent CaO _____ 50.20
Percent Na$_2$O _____ 4.60
Percent F$_2$ _____ 0.08

P$_2$O$_5$ available:
0.4% HCl _____ 39.75
2% citric _____ 37.70
Neu. amm. citrate _____ 37.30

The principal advantage of carrying out the calcination in two passes is that the soft cakes and lumps, which are formed at the relatively low temperature of the first pass, are easily broken down by mechanical crushers before going to the second pass where the temperature employed would otherwise cause the cakes and lumps to fuse or glaze to such a degree that satisfactory defluorination cannot take place. Once these cakes and lumps are broken down they have little tendency to reform, consequently a higher feed rate can be employed in the second pass than in a single stage operation in the same kiln. The increased output results in a lower unit cost of the finished product. Since the first pass greatly reduces the tendency of the charge to form or reform cakes and lumps, the operation in the second pass, which is the defluorinating burn, is much smoother. In other words, most of the operating difficulties are confined to the first pass or calcining burn, where their deleterious effects are of small if any practical significance, and the critical second pass or defluorinating burn may consequently be carried out with almost complete freedom from operating difficulties.

Contrasted with the method of our aforementioned application Ser. No. 213,284, in which calcination is carried out in the presence of the reaction product of sodium carbonate and phosphoric acid, the method of the present invention has the following advantages:

(1) Sodium chloride is cheaper than soda ash, and the reagent cost is thereby reduced about $3.50 per ton of final marketable calcine.

(2) The calcining charge is capable of withstanding a higher concentration of fluorine in the gaseous atmosphere in contact therewith, resulting in increased output and hence lower cost per ton of final calcine.

(3) The calcining charge is more amenable to defluorination in one of the two coordinated stages of calcination in which a fluorine-enriched phosphatic material is defluorinated, with fluorine recovery, in the other stage, disclosed in Hollingsworth's copending application for Letters Patent of the United States Ser. No. 314,842, filed Oct. 15, 1952, now Patent No. 2,753,253.

(4) Sodium chloride can be directly dissolved in unconcentrated phosphoric acid as received from the acid plant.

(5) Less tendency to sinter, form balls and rings in the kiln.

(6) In view of the less tendency to sinter, the need and advantages of two stage calcination are minimized, and elimination of the first pass becomes possible in more operations.

There is in the present method an increase in corrosive gases since some hydrochloric acid (HCl) will be present along with the hydrofluoric acid (HF). If the gaseous product of the kiln operation is discharged to the atmosphere, these corrosive gases must be neutralized, as for example by blowing powdered limestone into the base of the stack. On the other hand, where the plant is equipped to recover fluorine from the gaseous product of the defluorination calcination, it is easy to also recover and market the hydrochloric acid. The presence of hydrochloric acid does increase kiln corrosion, especially in the first pass kiln, but on the other hand the presence of hydrochloric acid appears, to some extent at least, to have a beneficial effect on defluorination.

Throughout this specification and the appended claims, sizing is expressed in terms of Tyler standard screen-scale sieves, and "without substantial fusion" means in the absence of such fusion or sintering as to cause the charge to become sticky, in whole or in part, and tend to cling or stick to the wall of the calcining apparatus, and, in a rotary kiln, to ball-up and to fail to flow freely and easily through the kiln. By "substantially defluorinated" is meant a phosphate product containing less than 1 part of fluorine per 100 parts of phosphorus. The proportioning of the phosphate rock and reagent mixture in making up the calcining charge, herein variously specified, is to be understood as applying to the charge as initially fed to the calcining apparatus.

We claim:

1. The method of defluorinating phosphate rock which comprises subjecting the rock with a silica content of from 2 to 6% to calcination at a temperature of at least 2600° F. without substantial fusion in the presence of water vapor and of a reagent mixture consisting essentially of sodium chloride and phosphoric acid, the mol ratio of the sodium and phosphorus contents (calculated as $Na_2O$ and $P_2O_5$ respectively) of the reagent mixture being between 1.6 and 2.8 and the CaO, $Na_2O$, $P_2O_5$ and $SiO_2$ content of the combined phosphate rock and reagent mixture being such that the mol ratio of these constituents in the molar formula $$\frac{\text{Mols CaO} + Na_2O - 3P_2O_5}{\text{Mols SiO}_2}$$

is between 1.3 and 2.8, and maintaining the calcining charge at said calcining temperature for a sufficient period of time to produce a phosphate product having high fertilizer availability and containing less than one part of fluorine for each 100 parts of phosphorus.

2. The method of claim 1 in which calcination of the phosphate rock and reagent mixture is carried out in two stages each without substantial fusion and in the presence of water vapor, the first stage of calcination being carried out at a temperature between 2000 and 2500° F. and the clinker from the first stage of calcination being crushed to mostly minus 3 mesh, and the crushed clinker being subjected to the second stage of calcination at a temperature of at least 2600° F.

References Cited in the file of this patent
UNITED STATES PATENTS

| | | |
|---|---|---|
| 1,878,185 | Roethe | Sept. 20, 1932 |
| 2,093,176 | Tromel | Sept. 14, 1937 |
| 2,288,112 | Shoeld | June 30, 1942 |
| 2,337,498 | Ritter et al. | Dec. 21, 1943 |
| 2,442,969 | Butt | June 8, 1948 |
| 2,556,541 | Hollingsworth | June 12, 1951 |